United States Patent
Guarnieri et al.

(10) Patent No.: US 10,545,848 B2
(45) Date of Patent: Jan. 28, 2020

(54) BOOSTING THE EFFICIENCY OF STATIC PROGRAM ANALYSIS USING CONFIGURATION TUNING

(71) Applicant: International Business Machines Corporation, Armonk, NY (US)

(72) Inventors: Salvatore Guarnieri, New York, NY (US); Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 15/290,690

(22) Filed: Oct. 11, 2016

(65) Prior Publication Data

US 2018/0101463 A1  Apr. 12, 2018

(51) Int. Cl.
  *G06F 11/36* (2006.01)
  *G06F 11/00* (2006.01)

(52) U.S. Cl.
  CPC .......... *G06F 11/3604* (2013.01); *G06F 11/00* (2013.01); *G06F 11/36* (2013.01); *G06F 11/3624* (2013.01); *G06F 11/3688* (2013.01)

(58) Field of Classification Search
  CPC .................. G06F 8/30–78; G06F 11/36–3696
  See application file for complete search history.

(56) References Cited

U.S. PATENT DOCUMENTS

| | | | |
|---|---|---|---|
| 7,975,257 B2 | 7/2011 | Fanning et al. | |
| 8,230,265 B2* | 7/2012 | Rajashekara | G06F 11/3676 714/38.11 |
| 9,355,246 B1 | 5/2016 | Wan et al. | |
| 9,612,943 B2* | 4/2017 | Boshernitsan | G06F 11/368 |
| 2011/0246834 A1* | 10/2011 | Rajashekara | G06F 11/3676 714/38.1 |
| 2015/0007140 A1* | 1/2015 | Boshernitsan | G06F 11/368 717/124 |
| 2015/0178182 A1* | 6/2015 | Mallya | G06F 11/3672 717/124 |
| 2017/0212829 A1 | 7/2017 | Bales et al. | |
| 2018/0046564 A1* | 2/2018 | Muske | G06F 11/3604 |

* cited by examiner

*Primary Examiner* — Hanh Thi-Minh Bui
*Assistant Examiner* — Christopher J Franco
(74) *Attorney, Agent, or Firm* — Scully, Scott, Murphy & Presser, P.C.; Daniel Morris

(57) ABSTRACT

An improved static program analysis procedure is provided by formulating a set of seeding configurations, and selecting a subset of queries posed by the static program analysis procedure. In response to one or more queries of the subset of queries being answered positively under at least one configuration of the set of seeding configurations, the one or more queries are determined to be valid queries. Each query of the valid queries is evaluated under each configuration of the set of seeding configurations to determine an accuracy score for each seeding configuration. A seeding configuration having a highest accuracy score is selected as a tool configuration to be used with the static program analysis procedure.

14 Claims, 3 Drawing Sheets

BOOSTING THE EFFICIENCY OF STATIC PROGRAM ANALYSIS USING CONFIGURATION TUNING

FIELD

The present application relates generally to code verification and, more particularly, to techniques for improving the efficiency of static program analysis methods.

BACKGROUND

Code verification and validation is the process of determining that a software program meets all specifications and fulfills its intended purpose. Code verification addresses the issue of the software program achieving its goals without any bugs or gaps. On the other hand, code validation ascertains whether or not the software meets high-level requirements and addresses the problem to be solved. Code verification ensures that "you built it right". Code validation ensures that "you built the right thing".

Static program analysis refers to analyzing computer software without actually executing the software. Static program analysis has been shown to be of great value in automating code verification tasks. Examples include functional verification tools such as Coverity™, as well as security analysis tools such as IBM Security AppScan Source Edition™ and HP Fortify 360™. One challenge faced by all tools based upon static program analysis is to achieve a proper balance between precision and scalability. Precision is achieved by building a granular albeit expensive analysis model. Scalability requires the opposite—a lightweight and less descriptive model.

A broad spectrum of parameters and models are available for determining the precision and scalability of the analysis tool. Some illustrative examples include a heap model, libraries and frameworks, virtual methods, path sensitivity, flow sensitivity, and reflection.

Heap Model: The heap model is based upon modeling dynamic memory allocation. This modeling process could lead to an unbounded number of runtime objects, and so the analysis must apply some type of finite approximation. The question of how to model runtime objects has received extensive treatment, resulting in many different heap modeling techniques. Some techniques are computationally cheap, such as Open Computer Forensics Architecture (OCFA). Others are computationally expensive, such as Three Valued Logic Analyzer (TVLA).

Libraries and Frameworks: The code to be considered in a given scope of analysis is primarily contributed by libraries and frameworks. For scalability, certain analyses model the effects of library calls conservatively via generic summaries. Other analyses that are more precise dive into the implementation to derive an accurate model of the library or framework's behavior.

Virtual Methods: Resolving virtual method calls is an undecidable problem in general. The difficulty relates to determining an exact identity of the object or objects flowing into the invocation site. Doing so precisely may involve abstraction refinement, demand-driven pointer analysis, on-demand interprocedural type inference, or another nontrivial technique. Alternatively, the analysis could make a conservative decision and resolve the invocation per all possible receiver abstractions.

Path Sensitivity: An important consideration is whether to explicitly model assertions following from branching along conditional and looping statements. Doing so undoubtedly enhances precision, but at the same time, a state space maintained by the analysis is split on every path condition. This can lead to a solution where a quantity is undefined or goes to infinity.

Flow Sensitivity: Another aspect is flow sensitivity which renders a decision as to whether or not to account for the order in which memory updates are performed. Naturally, flow insensitivity yields a much more scalable analysis compared to being flow sensitive.

Reflection: Similar to virtual calls, varying levels of precision may be provided in resolving reflective constructs, such as deciding a concrete identity of a type allocated via reflection. These processes involve both backward and forward traversal of a program's control structure to derive constraints on the behavior of a reflective statement (e.g., downstream downcasts).

The foregoing discussion indicates that the question of how to optimally balance between precision and scalability is naturally undecidable. It is impossible, in general, to compute a precise tradeoff between the two such that the analysis achieves the most accurate results without leading to a computer system crash. Thus, there exists a need to overcome at least one of the preceding deficiencies and limitations of the related art.

SUMMARY

The following summary is merely intended to be exemplary. The summary is not intended to limit the scope of the claims.

A computer-executed method for providing an improved static program analysis procedure, in one aspect, comprises formulating a set of seeding configurations, selecting a subset of queries posed by the static program analysis procedure, each query of the subset of queries being directed to whether or not an operation or a subset of the operation is predicted to be executed safely; in response to one or more queries of the subset of queries being answered positively under at least one configuration of the set of seeding configurations, determining that the one or more queries are valid queries; evaluating each query of the valid queries under each configuration of the set of seeding configurations to determine an accuracy score for each configuration of the set of seeding configurations, and selecting a seeding configuration having a highest accuracy score among the set of seeding configurations as a tool configuration to be used with the static program analysis procedure.

A computer program product for providing an improved static program analysis procedure, in another aspect, comprises a non-transitory computer-readable storage medium having a computer-readable program stored therein, wherein the computer-readable program, when executed on a computer system comprising at least one processor, causes the computer system to formulate a set of seeding configurations, select a subset of queries posed by the static program analysis procedure, each query of the subset of queries being directed to whether or not an operation or a subset of the operation is predicted to be executed safely; in response to one or more queries of the subset of queries being answered positively under at least one configuration of the set of seeding configurations, determine that the one or more queries are valid queries; evaluate each query of the valid queries under each configuration of the set of seeding configurations to determine an accuracy score for each configuration of the set of seeding configurations, and select a seeding configuration having a highest accuracy score among the set of seeding configurations as a tool configuration to be used with the static program analysis procedure.

An apparatus for providing an improved static program analysis procedure, in another aspect, may comprise a processor and a non-transitory computer-readable memory coupled to the processor, wherein the memory comprises instructions which, when executed by the processor, cause the processor to formulate a set of seeding configurations, select a subset of queries posed by the static program analysis procedure, each query of the subset of queries being directed to whether or not an operation or a subset of the operation is predicted to be executed safely; in response to one or more queries of the subset of queries being answered positively under at least one configuration of the set of seeding configurations, determine that the one or more queries are valid queries; evaluate each query of the valid queries under each configuration of the set of seeding configurations to determine an accuracy score for each configuration of the set of seeding configurations, and select a seeding configuration having a highest accuracy score among the set of seeding configurations as a tool configuration to be used with the static program analysis procedure.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1A:
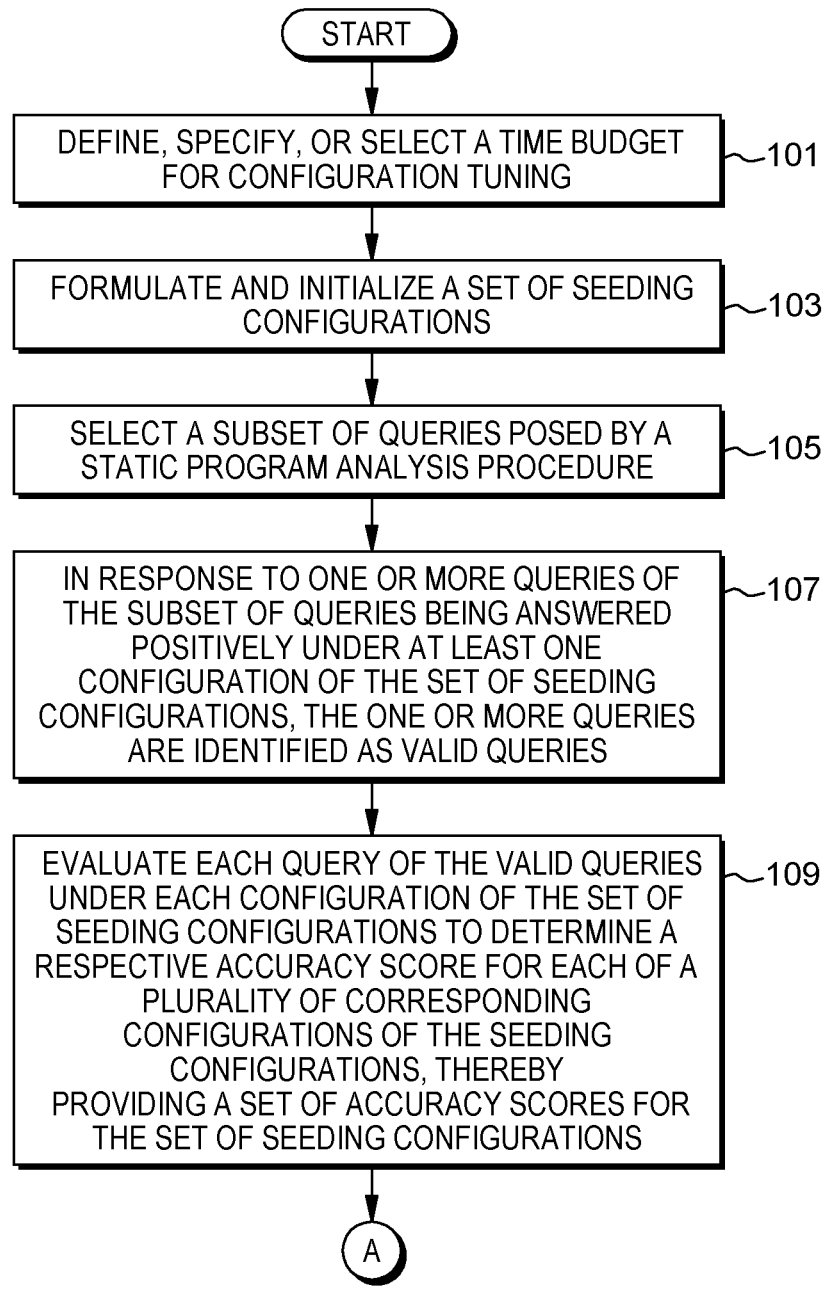
FIGS. 1A-1B together comprise a flowchart illustrating an exemplary method for performing static program analysis using configuration tuning.
Figure 1B:
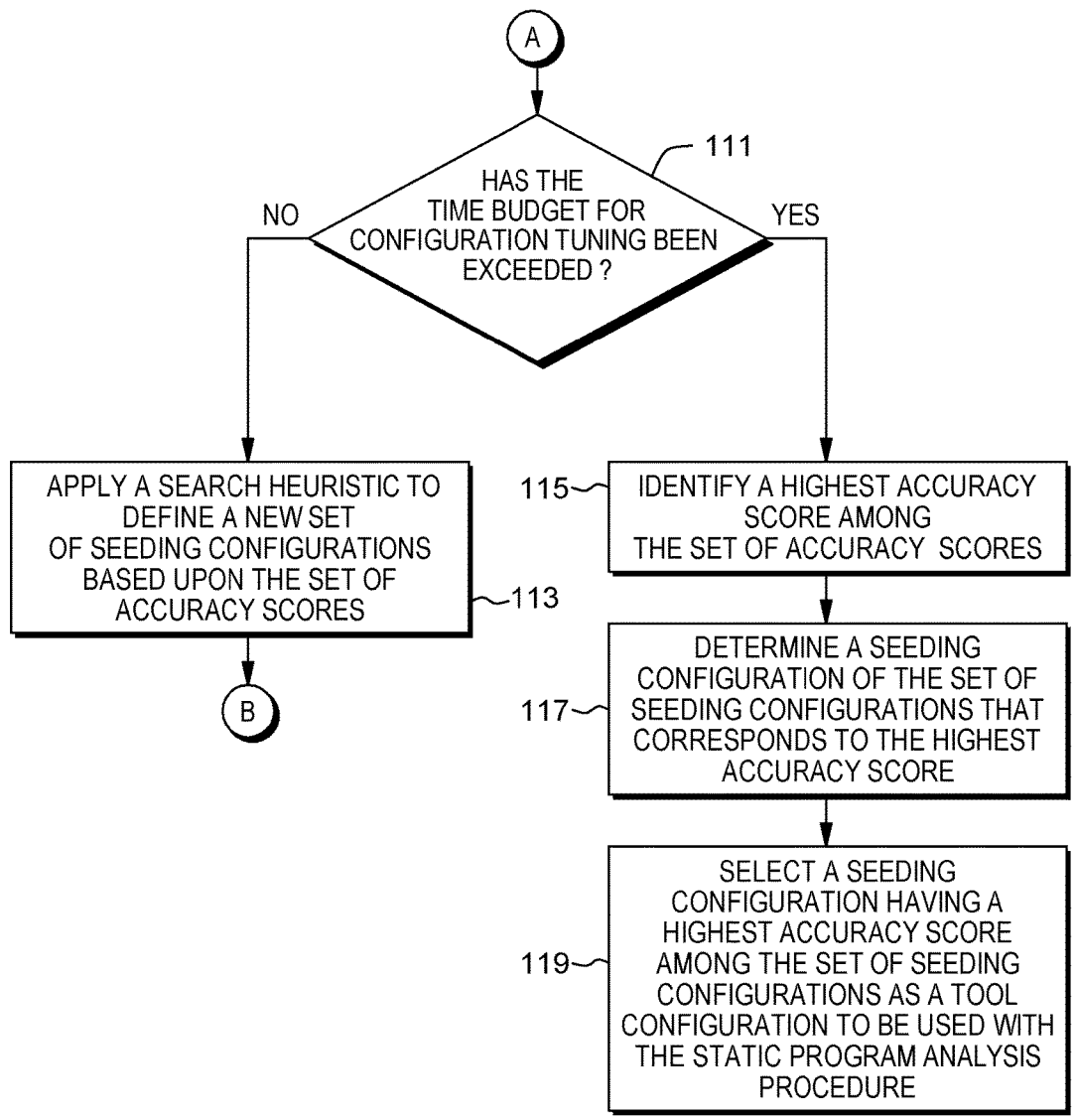

FIGS. 1A-1B together comprise a flowchart illustrating an exemplary method for performing static program analysis using configuration tuning. The procedure commences at block 101 where a time budget for configuration tuning is defined, specified, or selected. In general, system tuning refers to a process of optimizing a program or a system for a particular environment by adjusting one or more numerical parameters designed as hooks for tuning. One may optimize the tuning for time (fast execution), for space (least memory use), or in the present scenario, for a configuration that represents the most efficient use of hardware. Next, at block 103, a set of seeding configurations $C_i = \{C_1, \ldots C_k\}$ is formulated and initialized. Then, at block 105, a subset Q of queries posed by the static program analysis procedure is selected. Alternatively or additionally, all queries posed by the static program analysis procedure may be selected. Each query of the subset Q of queries is directed to whether or not an operation or a subset of the operation is predicted to be executed safely.

The operational sequence progresses to block 107 where, in response to one or more queries $Q_i = q_1 \ldots q_w$ of the subset of queries being answered positively under at least one configuration of the set of seeding configurations, the one or more queries $Q_i = q_1 \ldots q_w$ are identified as valid queries. Next, at block 109, each query of the valid queries is evaluated under each configuration of the set of seeding configurations to determine an accuracy score for each configuration $C_i$ of the set of seeding configurations. The accuracy score is determined as follows. For each configuration $C_i$: If an $i^{th}$ configuration $C_i$ causes the static program analysis procedure to crash or to time out, then the accuracy score for the $i^{th}$ configuration $C_i$ is set to zero. Otherwise, the accuracy score for the $i^{th}$ configuration $C_i$ is determined to be a proportion of the one or more identified valid queries $Q_i = q_1 \ldots q_w$ that are answered positively under the $i^{th}$ configuration $C_i$ within the subset Q of queries: $|\{q \text{ in } Q_i: q \text{ answered positively under } C_i\}|/|Q|$.

At block 111, a test is performed to ascertain whether or not the time budget for configuration tuning that was defined, specified, or selected at block 101 has been exceeded. If the time budget has not been exceeded, the program progresses to block 113 where a search heuristic is applied to define a new set of seeding configurations based upon the scores assigned to each of the configurations $C_i$. The program then loops back to block 105.

The affirmative branch from block 111 leads to block 115 where a highest accuracy score among the set of accuracy scores is identified. Next, at block 117, a seeding configuration of the set of seeding configurations $C_i$ is identified that corresponds to the highest accuracy score. Then, at block 119, the identified seeding configuration corresponding to the highest accuracy score among the set of seeding configurations is selected as a tool configuration to be used with the static program analysis procedure.

As mentioned previously, system tuning refers to a process of optimizing a program or a system for a particular environment by adjusting one or more numerical parameters designed as hooks for tuning. One may optimize the tuning for time (fast execution), for space (least memory use), or for a configuration that represents the most efficient use of hardware. In the present example, these numerical parameters are provided by using the seeding configuration having the highest accuracy score among the set of seeding configurations $C_i$.

The static program analysis procedure of FIGS. 1A and 1B may be implemented using any analysis tool that is performed without actually executing the code of a software program under test. In some cases, the analysis is performed on source code, and in other cases, the analysis is performed on object code. In general, static program analysis takes place within a specific program or subroutine, without connecting to the context of that program.

Static program analysis may be performed on any of three basic levels. These include a technology level, a system level, and a mission/business level. The technology level takes into account interactions between a plurality of unit programs to obtain a holistic and semantic view of the overall program in order to locate issues and avoid obvious false positives. The system level takes into account interactions between unit programs, but without being limited to one specific technology or programming language. The mission/business level takes into account terms, rules and processes that are implemented within the software system for its operation as part of enterprise or program/mission layer activities. These elements are implemented without being limited to one specific technology or programming language and in many cases are distributed across multiple languages but are statically extracted and analyzed for system understanding for mission assurance.

Formal methods may be used to implement static program analysis. Formal methods refers to a category of analysis tools where results are obtained purely through the use of rigorous mathematical methods. Mathematical techniques such as denotational semantics, axiomatic semantics, operational semantics, abstract interpretation, or any of various combinations thereof may be employed. However, using formal methods to locate all possible run-time errors in an arbitrary program (or more generally any kind of violation of a specification on the final result of a program) is an undecidable problem. No mathematical method exists that can always answer truthfully whether an arbitrary program may or may not exhibit runtime errors. This result dates from the works of Church, Gedel and Turing in the 1930s. As with many undecidable questions, one can still attempt to provide useful approximate solutions.

In practice, formal static program analysis may be implemented using model checking, data-flow analysis, abstract interpretation, Hoare logic, symbolic expression, or any of various combinations thereof. Model checking considers software that has finite states, or that may be reduced to finite states by abstraction. Data-flow analysis is a lattice-based technique for gathering information about a possible set of values. Abstract interpretation models an effect that each of a plurality of statements has on a state of an abstract machine. The software is "executed" based on the mathematical properties of each statement. However, this abstract machine over-approximates the behaviors of the software. The abstract software is thus made simpler to analyze, at the expense of incompleteness. Not every property true of the original software will be true of the abstracted software. If performed properly, abstract interpretation is a sound technique. Every property true of the abstracted software can be mapped to a true property of the original software.

Hoare logic is a formal system with a set of logical rules for reasoning rigorously about the correctness of computer programs. Symbolic execution is another formal system that is used to derive mathematical expressions representing values for a plurality of mutated variables at particular points in the code.

With regard to block 113 (FIG. 1B), any of a variety of different methods may be used to guide the search for an effective configuration for any of the foregoing static program analysis tools, or for any other static program analysis tool not mentioned previously. Genetic algorithms represent one notable family of search techniques. Genetic algorithms belong to a larger class of algorithms called evolutionary algorithms which generate solutions to optimization problems using techniques inspired by biological natural evolution, such as inheritance, mutation, selection, and crossover.

In the field of artificial intelligence, a genetic algorithm is a search heuristic that mimics the process of natural selection. This heuristic (also sometimes called a metaheuristic) can be used to generate useful solutions to optimization and search problems. Pursuant to a genetic algorithm, a population of candidate solutions (called individuals, creatures, or phenotypes) to an optimization problem is evolved towards better solutions. Each candidate solution has a set of properties (its chromosomes or genotype) which can be mutated and altered. In some cases, solutions are represented in binary as strings of 0's and 1's, but other encodings are also possible.

The evolution towards better solutions may start from a population of randomly-generated individuals. Evolution is an iterative process, with the population in each iteration called a generation. In each generation, the fitness of every individual in the population is evaluated. The fitness is usually defined in terms of a value of an objective function in the optimization problem being solved. The individuals having the greatest fitness are stochastically selected from the current population, and each individual's genome is modified (recombined and possibly randomly mutated) to form a new generation. The new generation of candidate solutions is then used in the next iteration of the genetic algorithm. Illustratively, the genetic algorithm terminates when either a maximum number of generations has been produced, or a satisfactory fitness level has been reached for population.

The genetic algorithm requires defining a genetic representation of a solution domain, and formulating a fitness function to evaluate the solution domain. Once the genetic representation and the fitness function are defined, the genetic algorithm proceeds to initialize a population of solutions, and then to improve these solutions through repetitive application of mutation, crossover, inversion and selection operators. This generational process is repeated until a termination condition has been reached. Terminating conditions may comprise one or more of: a solution is found that satisfies minimum criteria; a fixed number of generations are reached; an allocated budget (in terms of computation time and/or money) is reached; the fitness of a highest ranking solution is reaching or has reached a plateau such that successive iterations no longer produce better results; manual inspection; or any of various combinations thereof.

As an alternative or addition to genetic algorithms, a technique called hill climbing may be used in conjunction with block 113 to guide the search for an effective configuration. In the field of computer science, hill climbing is a mathematical optimization technique which belongs to a family of techniques called local search. Hill climbing is an iterative algorithm that starts with an arbitrary solution to a problem, and then attempts to find a better solution by incrementally changing a single element of the solution. If the change produces a better solution, an incremental change is made to the new solution, repeating until no further improvements can be found.

Hill climbing attempts to maximize (or minimize) a target function $f(x)$, where x is a vector of continuous and/or discrete values. At each iteration, the hill climbing algorithm adjusts a single element in x and determines whether the change in this single element improves the value of $f(x)$. Note that this approach differs from gradient descent methods which adjust all of the values in x at each iteration according to a gradient of the hill. With hill climbing, any change that improves $f(x)$ is accepted, and the process continues until no change can be found to improve the value of $f(x)$. Then x is said to be "locally optimal". In discrete vector spaces, each possible value for x may be visualized as a vertex in a graph. Hill climbing will follow the graph from vertex to vertex, always locally increasing or decreasing) the value of $f(x)$, until a local maximum local minimum) $x_m$ is reached.

For purposes of illustration, hill climbing can be applied to a travelling salesman problem where a salesman is required to visit a number of different cities. It is easy to find an initial solution where the salesman is scheduled to visits all of the cities, but this initial solution will likely be very poor and inefficient compared to an optimal solution. The hill climbing algorithm starts with such an initial solution and makes small incremental improvements to the solution, such as switching the order in which two cities are visited. Eventually, a much shorter and more efficient route is likely to be obtained.

The hill climbing algorithm is well suited for finding a local optimum in the form of a solution that cannot be improved upon only by considering a neighboring configuration. However, the hill climbing algorithm is not necessarily guaranteed to find a best possible solution (a global optimum) out of all possible solutions (a search space). In order to overcome this limitation, it is possible to use repeated local searches (restarts), or more complex schemes based on iterations, such as an iterated local search on memory, a reactive search optimization on memory, a tabu search, or a memory-less stochastic modification such as simulated annealing.

As an alternative or addition to genetic algorithms and hill climbing algorithms, a technique called simulated annealing may be used in conjunction with block 113 to guide the search for an effective configuration. Simulated annealing is a probabilistic technique for approximating a global optimum of a given function. Specifically, this technique is a metaheuristic to approximate global optimization in a large search space. Simulated annealing may be used when a search space is discrete. One illustrative example of a discrete search space comprises all tours that visit a given set of cities. For problems where finding the precise global optimum is less important than finding an acceptable local optimum in a fixed amount of time, simulated annealing may be preferable to alternatives such as brute-force search or gradient descent.

Simulated annealing exploits a property called slow cooling. Slow cooling refers to a slow decrease in the probability of accepting worse solutions as the technique progressively explores the solution space. Accepting worse solutions is a fundamental property of metaheuristics because it allows for a more extensive search for the optimal solution. The state of a physical system s, and a function E(s) to be minimized is analogous to an internal energy of the system in that state. The goal is to bring the system, from an arbitrary initial state, to a state with the minimum possible energy. At each step, the simulated annealing heuristic considers one or more neighboring states s' of the current state s, and probabilistically decides between moving the system to state s' or staying in state s. These probabilities ultimately lead the system to move to states of lower energy. The foregoing step is repeated until the system reaches a state that is good enough for the application, or until a given computation budget has been exhausted.

The neighbors of a state are new states of the problem that are produced after altering a given state in some well-defined way. For example, in the travelling salesman problem discussed previously, each state is typically defined as a permutation of the cities to be visited. The neighbors of a state are the set of permutations that are produced, for example, by reversing the order of any two successive cities. The well-defined way in which the states are altered in order to find neighboring states is called a "move" and different moves give different sets of neighboring states. These moves usually result in minimal alterations of the last state, as the previous example depicts, in order to help the simulated annealing algorithm retain the better parts of the solution and change only the worse, parts. In the traveling salesman problem, each respective part of the solution corresponds to a specific city-to-city connection.

Searching for neighbors of a state is fundamental to simulated annealing optimization because a final solution will be found after a tour of successive neighbors is performed. Simple heuristics move from neighbor to neighbor by finding a sequence of best neighbors, and the heuristics stop when a solution is reached which has no neighbors that are better solutions. One problem with this approach is that the neighbors of a state are not guaranteed to contain any of the existing better solutions. This means that failure to find a better solution among them does not guarantee that no better solution exists. This is why the best solution found by such algorithms is called a local optimum, in contrast with the actual best solution which is called a global optimum. Metaheuristics use the neighbors of a solution as a way to explore the solution space, and although the metaheuristics prefer better neighbours, the metaheuristics also accept worse neighbours in order to avoid getting stuck at a local optima. If the simulated annealing algorithm were run for an infinite amount of time, the global optimum would eventually be found.

Figure 2:
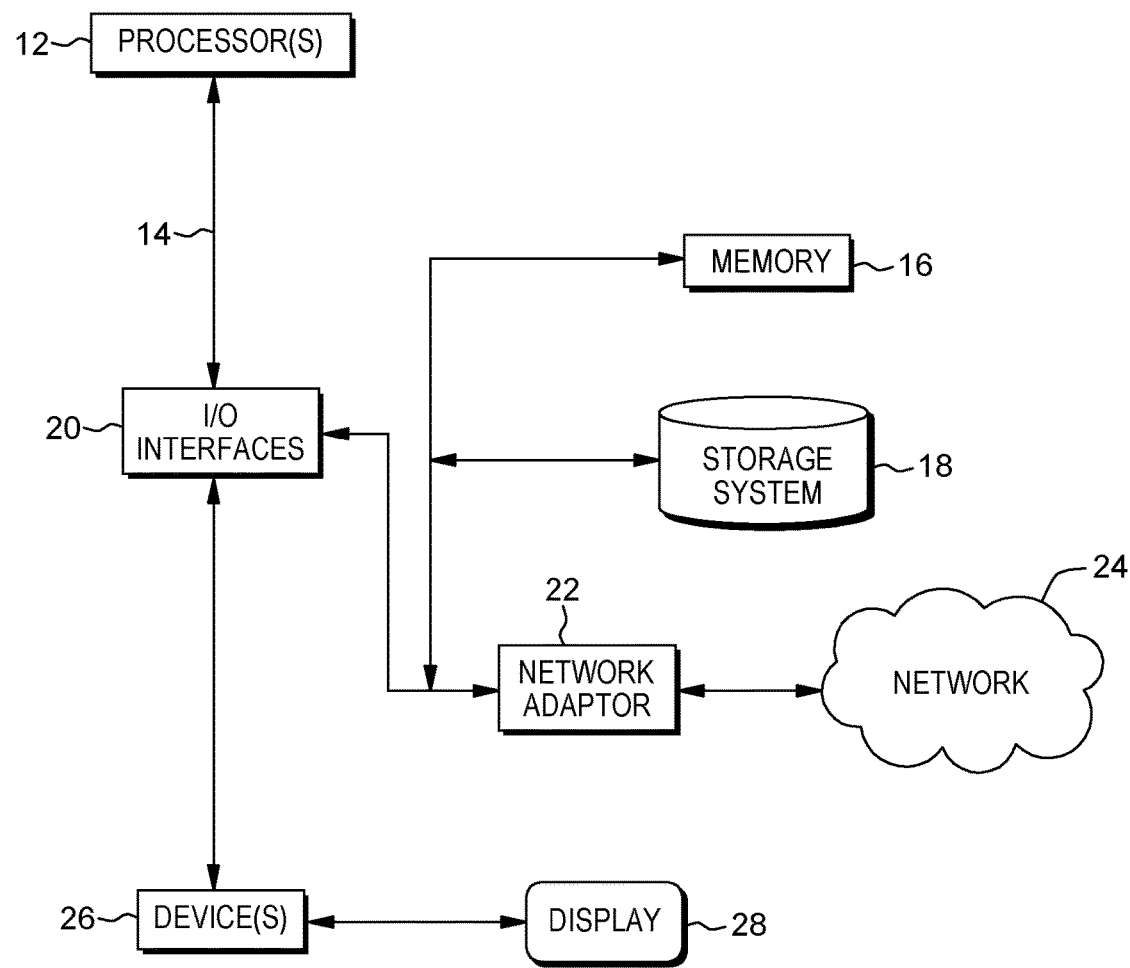
FIG. 2 is a hardware block diagram of an exemplary computer or processing system that may implement the method of FIGS. 1A-1B, in one set of embodiments of the present disclosure.

FIG. 2 illustrates a schematic of an exemplary computer or processing system that may implement the method of FIGS. 1A-1B, in one set of embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 2 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module that performs the methods described herein. The module may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. The computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-executed method for tuning a configuration of a static analysis tool to perform an improved static program analysis procedure on an input program, the method comprising:

receiving, at a processor, a specification of a time budget for the configuration tuning;

formulating, at the processor, a set of seeding configurations, the seeding configurations being tool configurations of the static analysis tool; and iteratively performing, by the processor:

selecting a subset of queries posed by the static program analysis procedure, each query of the subset of queries being directed to whether or not an operation or a subset of the operation in the input program is predicted to be executed safely;

in response to one or more queries of the subset of queries being answered positively under at least one tool configuration of the set of seeding configurations, determining that the one or more positively answered queries are valid queries;

evaluating each query of the valid queries under each tool configuration of the set of seeding configurations to determine an accuracy score for each tool configuration of the set of seeding configurations; and determining, by the processor, whether the time budget for configuration tuning at a current iteration has been exceeded, and if the time budget has not been exceeded, applying, by the processor, a search heuristic to define a new set of seeding configurations based upon the set of accuracy scores and repeating the query selecting, the positive answers determining, and the evaluating, and time budget determining;

otherwise, upon determining a time budget for configuration tuning has been exceeded, configuring, using the processor, a static analysis tool with a tool configuration to be used with the static program analysis procedure for the input program based on a seeding configuration having a highest accuracy score among the set of seeding configurations.

2. The method of claim 1 further comprising determining the accuracy score for each configuration such that, when an $i^{th}$ configuration of the set of seeding configurations causes the static program analysis procedure to crash or to time out, then the accuracy score for the $i^{th}$ configuration is set to zero.

3. The method of claim 1 further comprising determining the accuracy score for an $i^{th}$ configuration of the set of seeding configurations as a proportion of the one or more valid queries that are answered positively under the $i^{th}$ configuration within the subset of queries.

4. The method of claim 1 further comprising performing the static program analysis on at least one of a technology level, a system level, or a mission/business level.

5. The method of claim 1 further comprising performing a search for the set of seeding configurations using a genetic algorithm.

6. An apparatus for tuning a configuration of a static analysis tool to perform an improved static program analysis procedure on an input program, the apparatus comprising a processor and a non-transitory computer-readable memory coupled to the processor, wherein the memory comprises instructions which, when executed by the processor, cause the processor to perform:

receiving a specification of a time budget for the configuration tuning;

formulating a set of seeding configurations, the seeding configurations being tool configurations of the static analysis tool; and iteratively performing:

selecting a subset of queries posed by the static program analysis procedure, each query of the subset of queries being directed to whether or not an operation or a subset of the operation in the input program is predicted to be executed safely;

in response to one or more queries of the subset of queries being answered positively under at least one tool configuration of the set of seeding configurations, determining that the one or more positively answered queries are valid queries;

evaluating each query of the valid queries under each tool configuration of the set of seeding configurations to determine an accuracy score for each tool configuration of the set of seeding configurations; and determining, by the processor, whether the time budget for configuration tuning at a current iteration has been exceeded, and if the time budget has not been exceeded, applying a search heuristic to define a new set of seeding configurations based upon the set of accuracy scores and repeating the query selecting, the positive answers determining, and the evaluating, and time budget determining;

otherwise, upon determining a time budget for configuration tuning has been exceeded, configuring a static analysis tool with a tool configuration to be used with the static program analysis procedure for the input program based on a seeding configuration having a highest accuracy score among the set of seeding configurations.

7. The apparatus of claim 6 further configured for determining the accuracy score for each configuration such that, when an $i^{th}$ configuration of the set of seeding configurations causes the static program analysis procedure to crash or to time out, then the accuracy score for the $i^{th}$ configuration is set to zero.

8. The apparatus of claim 6 further configured for determining the accuracy score for an $i^{th}$ configuration of the set of seeding configurations as a proportion of the one or more valid queries that are answered positively under the $i^{th}$ configuration within the subset of queries.

9. The apparatus of claim 6 further configured for performing the static program analysis on at least one of a technology level, a system level, or a mission/business level.

10. The apparatus of claim 6 further configured for performing a search for the set of seeding configurations using a genetic algorithm.

11. A computer program product for tuning a configuration of a static analysis tool to perform an improved static program analysis procedure on an input program, the computer program product comprising a computer-readable storage medium having a computer-readable program stored therein, wherein the computer-readable program, when executed on a computer system comprising at least one processor, causes the processor to perform:

receiving a specification of a time budget for the configuration tuning;

formulating a set of seeding configurations, the seeding configurations being tool configurations of the static analysis tool; and iteratively performing:

selecting a subset of queries posed by the static program analysis procedure, each query of the subset of queries being directed to whether or not an operation or a subset of the operation in the input program is predicted to be executed safely;

in response to one or more queries of the subset of queries being answered positively under at least one tool configuration of the set of seeding configurations, determining that the one or more positively answered queries are valid queries;

evaluating each query of the valid queries under each tool configuration of the set of seeding configurations to determine an accuracy score for each tool configuration of the set of seeding configurations; and determining whether the time budget for configuration tuning at a current iteration has been exceeded, and if the time budget has not been exceeded, applying a search heuristic to define a new set of seeding configurations based upon the set of accuracy scores and repeating the query selecting, the positive answers determining, and the evaluating, and time budget determining;

otherwise, upon determining a time budget for configuration tuning has been exceeded, configuring a static analysis tool with a tool configuration to be used with the static program analysis procedure for the input program based on a seeding configuration having a highest accuracy score among the set of seeding configurations.

12. The computer program product of claim 11 further configured for determining the accuracy score for each configuration such that, when an $i^{th}$ configuration of the set of seeding configurations causes the static program analysis procedure to crash or to time out, then the accuracy score for the $i^{th}$ configuration is set to zero.

13. The computer program product of claim 11 further configured for determining the accuracy score for an $i^{th}$ configuration of the set of seeding configurations as a proportion of the one or more valid queries that are answered positively under the $i^{th}$ configuration within the subset of queries.

14. The computer program product of claim 11 further configured for performing the static program analysis on at least one of a technology level, a system level, or a mission/business level.

* * * * *